US011151755B1

(12) United States Patent
Saad et al.

(10) Patent No.: US 11,151,755 B1
(45) Date of Patent: Oct. 19, 2021

(54) IMAGE PROCESSING FOR INCREASING VISIBILITY OF OBSCURED PATTERNS

(71) Applicant: Adobe Inc., San Jose, CA (US)

(72) Inventors: Michele Saad, Austin, TX (US); Lauren Dest, Austin, TX (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/942,103

(22) Filed: Jul. 29, 2020

(51) Int. Cl.
| | | |
|---|---|---|
| *G06T 11/00* | (2006.01) | |
| *G06T 5/00* | (2006.01) | |
| *G09G 5/02* | (2006.01) | |
| *G09G 5/10* | (2006.01) | |
| *H04N 1/60* | (2006.01) | |
| *H04N 9/64* | (2006.01) | |

(52) U.S. Cl.
CPC ............ *G06T 11/001* (2013.01); *G06T 5/009* (2013.01)

(58) Field of Classification Search
CPC combination set(s) only.
See application file for complete search history.

(56) References Cited

U.S. PATENT DOCUMENTS

| 2002/0126312 | A1* | 9/2002 | Waksman | ............ H04N 1/6016 |
| | | | | 358/2.1 |
| 2005/0008258 | A1* | 1/2005 | Suzuki | ............... H04N 1/40068 |
| | | | | 382/298 |
| 2019/0087679 | A1* | 3/2019 | Yamada | ............. H04N 1/40062 |

OTHER PUBLICATIONS

Brettel Hans, et al., "Computerized Simulation of Color Appearance for Dichromats", Journal of the Optical Society of America A, vol. 14, Issue 10, Oct. 1997, pp. 2647-2655.

* cited by examiner

*Primary Examiner* — Wesner Sajous
(74) *Attorney, Agent, or Firm* — Kilpatrick Townsend & Stockton LLP

(57) ABSTRACT

Methods and systems disclosed herein relate generally to systems and methods for modifying pixel values of an image to improve the visibility of target pixel patterns. A pixel-simulation application accesses an initial image including an initial set of pixel values. The initial set of pixel values define, in an initial color space, a particular color of pixels that indicate a target pixel pattern. The pixel-simulation application generates, based on the initial set of pixel values, a simulated image including a modified set of pixel values that visually indicate another color of pixels in an intermediate color space. The pixel-simulation application generates a pixel map by identifying a difference between the initial set pixel values of the initial image and the modified set of pixel values of simulated image. The pixel-simulation application generates, for display, an output image based at least in part on the pixel map.

20 Claims, 11 Drawing Sheets

IMAGE PROCESSING FOR INCREASING VISIBILITY OF OBSCURED PATTERNS

TECHNICAL FIELD

This disclosure generally relates to generating a simulated image to identify target pixel patterns. More specifically, but not by way of limitation, this disclosure relates to modifying pixel values of an image to improve the visibility of target pixel patterns.

BACKGROUND

An image typically includes a set of pixels, in which each pixel is represented by a set of pixel values. Each pixel value of the set corresponds to a different aspect of color, depending on the color space being used. For example, in a Red, Green, Blue (RGB) color-space space, the three pixel values in the set respectively denote the red, green, and blue components of the color of that pixel. In a Hue, Saturation, Lightness (HSL) color-space space, the three values in the vector denote the hue, saturation, and brightness of the color of that pixel.

Image content often cannot be seen by users having accessibility issues (e.g., color-vision deficiency). To address this issue, text alternatives are often provided to users in addition to the images. For example, when icons are added as images, alternative text describing the image content of the icons are provided with the icons. Providing alternative text can effectively convey the same information conveyed by simpler image content, but may begin to lose effectiveness if an image includes complicated pixel patterns that are difficult to describe in text. In other instances, color-vision accessibility issues are addressed by image transformation algorithms. For example, conventional techniques identify a set of pixels that represent colors known to be associated with low visibility to certain users (e.g., red-green colors) and transform values of the set of pixels so as to increase color visibility for those users.

SUMMARY

Certain embodiments involve modifying pixel values of an image to improve the visibility of target pixel patterns. For example, a pixel-simulation application accesses an initial image including an initial set of pixel values. The initial set of pixel values define, in an initial color space, a particular color of pixels that indicate a target pixel pattern. The pixel-simulation application generates a duplicate image from the initial image, in which the duplicate image includes the initial set of pixel values. The pixel-simulation application converts the initial set of pixel values of the duplicate image to an intermediate set of pixel values. The intermediate set of pixel values define the particular color of the pixels of the duplicate image in an intermediate color space. The pixel-simulation application modifies pixel values of the intermediate set of pixel values to generate a modified set of pixel values for the duplicate image. To do so, the pixel-simulation application modifies one or more pixel values from the intermediate set of pixel values such that the modified set of pixels visually indicate another color of pixels in the intermediate color space.

The pixel-simulation application converts the modified set of pixel values of the duplicate image to a simulated set of pixel values. The simulated set of pixel values define, in the initial color space, the other color of the pixels of the duplicate image. The pixel-simulation application generates a pixel map by identifying a difference between the initial set pixel values of the initial image and the simulated set of pixel values of duplicate image. The pixel-simulation application generates, for display, an output image based at least in part on the pixel map. The output image includes an output set of pixels values that define the target pixel pattern in the other color of pixels.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

FIG. 9 depicts a computing system configured for generating a simulated image to identify target pixel patterns in accordance with some embodiments.

DETAILED DESCRIPTION OF THE INVENTION

Figure 1:
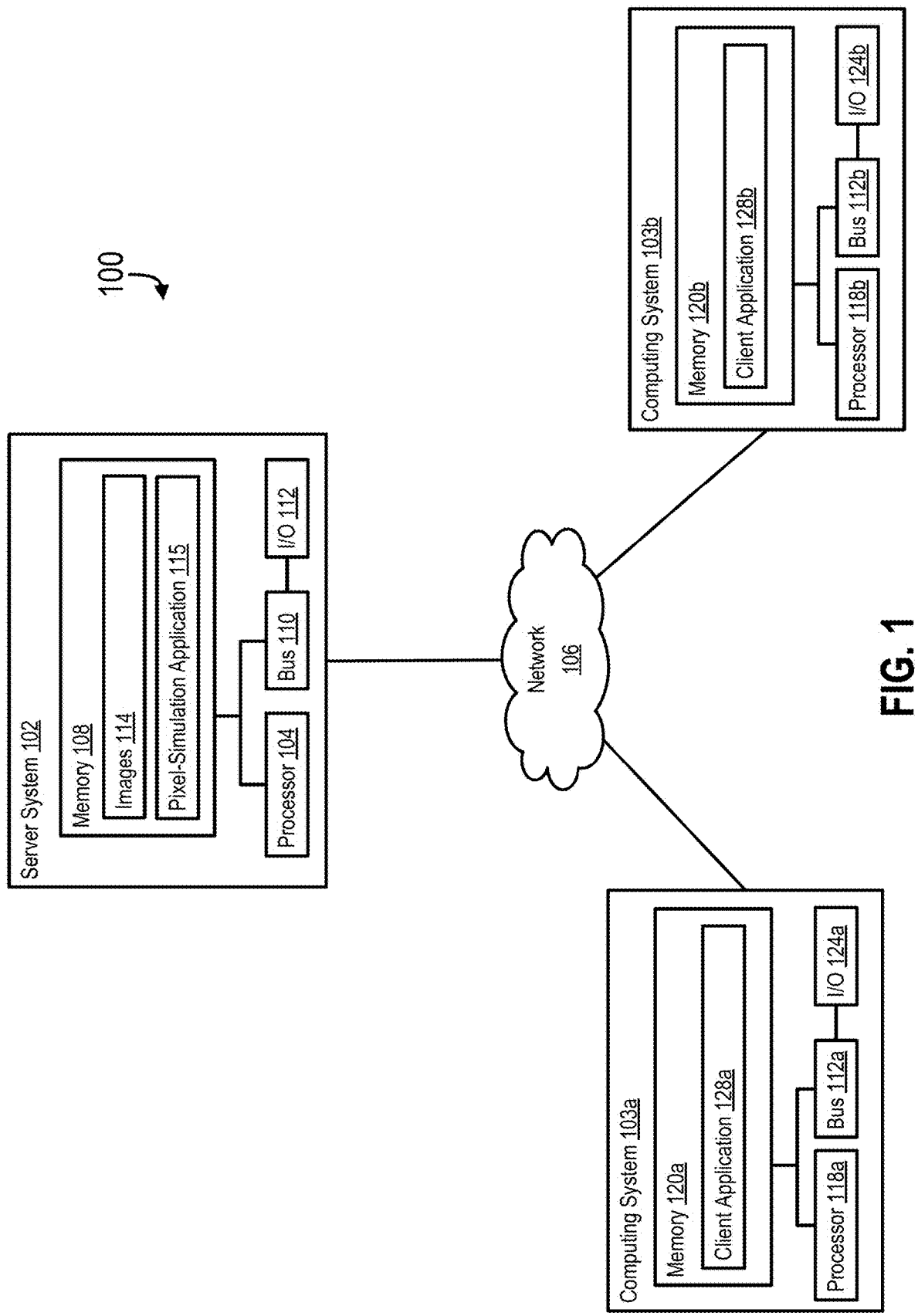
FIG. 1 illustrates a computing environment for generating a simulated image to identify target pixel patterns in accordance with some embodiments.

Conventional image-processing systems used to improve image visibility in accessibility tools transform pixel values that represent colors known to be associated with low visibility to certain users, so as to increase color visibility for those users. In addition, conventional systems may provide alternative text in addition to images to provide context for users with accessibility issues. However, these conventional techniques may result in conveying incomplete information (e.g., text ineffectively describing complex pixel patterns) or are ineffective for improving visual accessibility (e.g., images with modified pixels still does not increase visibility of hidden pixel patterns). Accordingly, existing techniques for increasing the visibility of "hidden" pixel patterns (i.e., pixel patterns that may not be visible for those with color-blindness) often fail to ensure that the pixel patterns are effectively identified from the image.

Certain embodiments described herein can address these problems by increasing visibility of hidden pixel patterns depicted in images. In an illustrative example, a pixel-simulation application accesses an initial image that includes an initial set of pixel values. The initial set of pixel values defines a particular color of pixels that indicate a target pixel pattern. For instance, the initial image could depict an image of shoes, and the target pattern in this initial image could be a swirled pattern that includes the orange and gray colors. The target pixel pattern could depict an obscured region of the initial image that is not visible to users with visual disabilities. In this example, a user with protanopia is capable of identifying some content of the initial image, but may have difficulties with identifying the swirled pattern because the orange color of the shoes may be perceived in a different color. The particular color of pixels (e.g., purple, orange-tinted reds) is defined in an initial color space, in which the initial color space is a Red, Green, Blue (RGB) color space or a Hue, Saturation, Brightness (HSB) color space.

The pixel-simulation application generates and modifies a duplicate of the initial image to improve the visibility of the target region to users with a visual disability. The pixel-simulation application uses the duplicate image to generate a pixel map that identifies the target pixel pattern, where the pixel map identifies the target pixel pattern such that the obscured region becomes more visible. Referring to the above example, the pixel map can thus depict the swirled pattern of the shoes depicted in the initial image, such that the visibility of the swirled pattern is substantially increased.

The pixel-simulation application converts the initial set of pixel values of the duplicate image, which are defined in the initial color space (e.g., RGB), to an intermediate set of pixel values that define the particular color of the pixels of the duplicate image in an intermediate color space. An example of this intermediate color space is a Long, Medium, Short (LMS) color space, in which each color channel of the LMS space represents one of the three types of cones of the human eye, named for their responsivity (sensitivity) peaks at long, medium, and short wavelengths. The pixel-simulation application modifies pixel values of the intermediate set of pixel values to generate a modified set of pixel values for the duplicate image. This modification involves updating one or more pixel values, such as values of a color channel (e.g., L-color channel). As a result, the modified set of pixels visually indicate another color of pixels in the intermediate color space.

Referring to the above example, pixel values of the shoe image can be modified, such that the image depicts a swirled pattern with light green and gray colors. The light green and gray pattern of the modified image may depict a color pattern that would be perceived by a user with protanopia, rather than the orange and gray pattern depicted in the initial image. Different pixel colors can be simulated by modifying a pixel of a particular color channel of the intermediate color space. For example, the modified pixel value is a pixel value at a Long (L) color channel of the LMS color space, such that the modified set of pixels visually indicate the other color of pixels from a protanopia perspective. In another example, the modified pixel value is a pixel value at a Medium (M) color channel of the LMS color space, such that the modified set of pixels visually indicate the other color of pixels from a deuteranopia perspective. In yet another example, the modified pixel value is a pixel value at a Short (S) color channel of the LMS color space, such that the modified set of pixels visually indicate the other color of pixels from a tritanopia perspective.

The pixel-simulation application converts the modified set of pixel values of the duplicate image to a simulated set of pixel values that define the other color of the pixels of the duplicate image. For instance, the simulated set of pixels could be defined in the initial color space (e.g., the RGB space). For example, a simulated image depicts the shoes with light green and gray patterns at the RGB space instead of the LMS space. By reverting the modified duplicate image into the initial color space, the pixel-simulation application can calculate the pixel map by identifying the difference between the initial image and the modified duplicate image. The pixel-simulation application generates the pixel map by identifying a difference between the initial set of pixel values of the initial image and the simulated set of pixel values of duplicate image. The pixel-simulation application can access a pixel value at a location of the initial image and subtract, from the accessed pixel value, a pixel value of the duplicate image at the same location in the duplicate image. The pixel-simulation application stores the difference between the two pixel values in the pixel map.

The pixel-simulation application generates an output image, which depicts the target pixel pattern in a different color or set of colors, based at least in part on the pixel map. Referring back to the above example, the output image is a grayscale image of the shoes that includes the swirled pattern in a manner that is easily identifiable by users with protanopia. In some instances, the output image depicts the target pixel pattern and remaining portions of the output image at a higher image-contrast ratio, such that visibility is substantially increased for the target pixel pattern. This would be different from an image that includes a hidden pixel pattern with a lower contrast ratio between the pixel pattern and the remaining portion of the input image. As a result, the pixel-simulation application may generate the output image such that it includes target pixel pattern that is identifiable by users with certain types of color blindness, including protanopia, deuteranopia, and tritanopia. In some instances, a contrast ratio between the target pixel pattern and a region in the output image is greater than a second contrast ratio between the target pixel pattern and the corresponding region in the initial image.

Certain embodiments described herein improve image-processing systems by implementing techniques that are effective in identifying hidden pixel patterns in the image. By generating a simulated image that simulates pixels that are perceived by a user with color-vision deficiency, the pixel-simulation application can derive a pixel map that reveals one or more target pixel patterns that may otherwise be unidentifiable to certain users. In some embodiments, the pixel map is derived using a pixel-by-pixel transformation of the input image based on the corresponding pixels the simulated image. The pixel-by-pixel transformation produces an improved output image that provides more precise visual information as compared to conventional techniques that simply convert a set of colors. The improved output images can also be used to improve performance of image-recognition systems that rely on processing images with identifiable content. Accordingly, embodiments herein reflect an improvement in functions of image-processing system and digital image processing technology.

Further, the pixel-simulation application can generate various images that simulate pixel patterns from various perspectives (e.g., protanopia, deuteranopia). The techniques implemented by the pixel-simulation application enable a user to identify the target pixel pattern regardless of the type of color-vision deficiency. Accordingly, embodiments herein reflect an improvement from existing accessibility systems that are typically limited to providing text for images that have reduced visibility.

Computing Environment

FIG. 1 illustrates a computing environment 100 for generating a simulated image to identify target pixel patterns in accordance with some embodiments. The computing systems in this example include a server system 102 and computing systems 103a and 103b in communication via a network 106.

The server system 102 includes a processor 104 that is communicatively coupled to a memory 108 and that executes computer-executable program instructions and/or accesses information stored in the memory 108. The processor 104 may include a microprocessor, an application-specific integrated circuit ("ASIC"), a state machine, or other suitable processing device. The processor 104 can include any of a number of computer processing devices, including one. Such a processor can include or may be in communication with a computer-readable medium storing instructions that, when executed by the processor 104, cause the processor to perform the steps described herein.

The server system 102 can provide access to images 114. The images 114 may be stored in any suitable computer-readable medium and execute on any suitable processor. In some embodiments, the images 114 are stored in the memory 108 at the server system 102. The images 114 can be accessed by the server system 102 from a remote location via a network 106 and provided to computing systems 103a and 103b. The images 114 may include pixel patterns that have reduced visibility to some users and can be transmitted by the server system 102 to the computing systems 103a and 103b. In some embodiments, the images 114 are generated by the server system 102 or by another system (e.g., application servers). By generating a simulated image from one of the images 114, the server system 102 may increase visibility of pixel patterns such the output image provides image content that can be easily identified for many users.

The images 114 may be expressed within a color space. A color space refers to an abstract mathematical model for representing the colors that comprise an image. Color spaces help to ensure consistency in color representation across the potentially numerous different devices that may display a digital image. In several embodiments, each of the images 114 comprises a set of pixels. According to some color spaces, each pixel may be associated with a pixel value that is represented as a triplet of color-channel values. For example, with respect to the RGB color space, the color-channel values correspond to the levels of red (R), green (G), and blue (B) primary colors present in the pixel. In some instances, multiple RGB color spaces exist depending on exactly which shade or hue of red, green, and blue is used as the primary color for R, G, and B (e.g., sRGB, Adobe RGB, ProPhoto RGB, scRGB, CIE RGB). In some embodiments, each of the color-channel values in the RGB color space is expressed as an integer between 0 and 255. A value of 0 may correspond to the darkest shade of a primary color, whereas a value of 255 may correspond to the lightest shade. Thus, [0, 0, 0] corresponds to black, and [255, 255, 255] corresponds to white.

A pixel-simulation application 115 stored in the memory 108 can configure the processor 104 to process images 114 to identify a target pixel pattern. The pixel-simulation application 115 can configure the processor 104 to access some or all of the images 114 stored in the memory 108 or any other suitable computer-readable medium. The pixel-simulation application 115 may provide a social media service, a cloud service, or other network service providing access to the images 114 as well as output images that identify target pixel patterns. A cloud service can include a collection of computing resources, including computing systems and/or applications, that can be provided as an online service via a data network. The collection of computing systems and/or hardware can be represented as a single service. The cloud service can provide a digital hub for browsing, creating, sharing, and otherwise using electronic content using one or more applications provided via the cloud service.

The pixel-simulation application 115 accesses an initial image (e.g., an image of the images 114) including an initial set of pixel values that define, in an initial color space (e.g., an RGB color space), a particular color of pixels that indicate a target pixel pattern. The pixel-simulation application 115 generates a duplicate image from the initial image and converts the initial set of pixel values of the duplicate image to an intermediate set of pixel values that define the particular color of the pixels of the duplicate image in an intermediate color space (e.g., an LMS color space). The pixel-simulation application 115 modifies pixel values of the intermediate set of pixel values, such that the modified set of pixels visually indicate another color of pixels in the intermediate color space.

The pixel-simulation application 115 reverts the modified set of pixel values of the duplicate image to a simulated set of pixel values that define the other color of the pixels of the duplicate image. The simulated set of pixel values are defined in the initial color space (e.g., the RGB space), to facilitate the generation of pixel maps. The pixel-simulation application 115 generates a pixel map by identifying a difference between the initial set pixel values of the initial image and the simulated set of pixel values of duplicate image. The pixel-simulation application 115 uses the pixel map, which provides difference of pixel values on pixel-by-pixel basis, to generate an output image the define the target pixel pattern. The output image thus includes target pixel patterns with increased visibility.

The server system 102 may also include a number of external or internal devices such as input or output devices. For example, the server system 102 is shown with an input/output ("I/O") interface 112. A bus 110 can also be included in the server system 102. The bus 110 can communicatively couple one or more components of the server system 102.

FIG. 1 also illustrates the pixel-simulation application 115 included in the memory 108 of the server system 102. The pixel-simulation application 115 can include one or more modules. The pixel-simulation application 115 can configure the server system 102 to access, modify, transmit, or otherwise use the images 114 in response to input provided by the client applications 128a and/or 128b. For example, the client application 128a transmits a query to retrieve an image of the images 114, at which the server system 102 may access the image by processing the query through a database system.

The pixel-simulation application 115 can also configure the server system 102 to allow multiple computing systems 103a and/or 103b or other client systems to access or otherwise use some or all of the images 114. In some embodiments, the pixel-simulation application 115 stores data in the memory 108 identifying client accounts via which the client applications 128a and/or 128b can access the pixel-simulation application 115. In other embodiments, the pixel-simulation application 115 accesses data from a remote data source that identifies client accounts via which the client applications 128a and/or 128b can access the pixel-simulation application 115. The pixel-simulation application 115 can store data describing associations between client accounts and items of the images 114.

The server system 102 can include any suitable computing system for hosting the pixel-simulation application 115. In one embodiment, the server system 102 may be a single computing system. In another embodiment, the server system 102 may be a virtual server implemented using a number of computing systems connected in a grid or cloud computing topology.

Each of the computing systems 103a and/or 103b includes a computer-readable medium such as processors 118a and/or 118b, respectively. Each of the processors 118a and/or 118b is communicatively coupled to a memory 120a and/or 120b, respectively. Each of the processors 118a and/or 118b respectively executes computer-executable program instructions and/or accesses information stored in the memory 120a and/or 120b. Each of the processors 118a and/or 118b may include a microprocessor, an ASIC, a state machine, or other processor. Each of the processors 118a and/or 118b can include any of a number of computer processing devices, including one. Such a processor can include or may be in communication with a computer-readable medium. The computer-readable medium stores instructions that when executed by the processor, cause the processor to perform the steps described herein.

The computing systems 103a and/or 103b may also include a number of external or internal devices such as a mouse, a CD-ROM, DVD, a keyboard, a display, audio speakers, one or more microphones, or any other input or output devices. For example, each of the computing systems 103a and/or 103b is respectively shown with input/output ("I/O") interfaces 124a, 124b and display devices 126a, 126b. Buses 122a, 122b can be respectively included in the computing systems 103a and/or 103b. Each of the buses 122a, 122b can communicatively couple one or more components of the computing systems 103a and/or 103b.

FIG. 1 also illustrates the client applications 128a and/or 128b respectively included in the memory 120a and/or 120b of the computing systems 103a and/or 103b. Each of the client applications 128a and/or 128b can include one or more software modules. The client applications 128a and/or 128b can respectively configure the processors 118a and/or 118b to modify or otherwise access the images 114 provided by the server system 102 via the network 106. The client applications 128a and/or 128b can respectively configure the processors 118a and/or 118b to respectively render some or all of the images 114 as well as output images that include unmasked pixel patterns. For example, each of the client applications 128a and/or 128b is an internet browser application, a social media application, and the like. A network session for accessing or otherwise modifying the images 114 can be established by the client applications 128a and/or 128b via the network 106 between computing systems 103a and/or 103b and the server system 102.

In some embodiments, the computing systems 103a and/or 103b include any suitable client devices for communicating via a network 106 and executing the client applications 128a and/or 128b. Non-limiting examples of a computing device include a desktop computer, a tablet computer, a smart phone, or any other computing device suitable for using electronic content. In other embodiments, the computing systems 103a and/or 103b include server systems for providing electronic content items via the client applications 128a and/or 128b.

Process for Generating a Simulated Image to Identify Target Pixel Patterns

Figure 2:
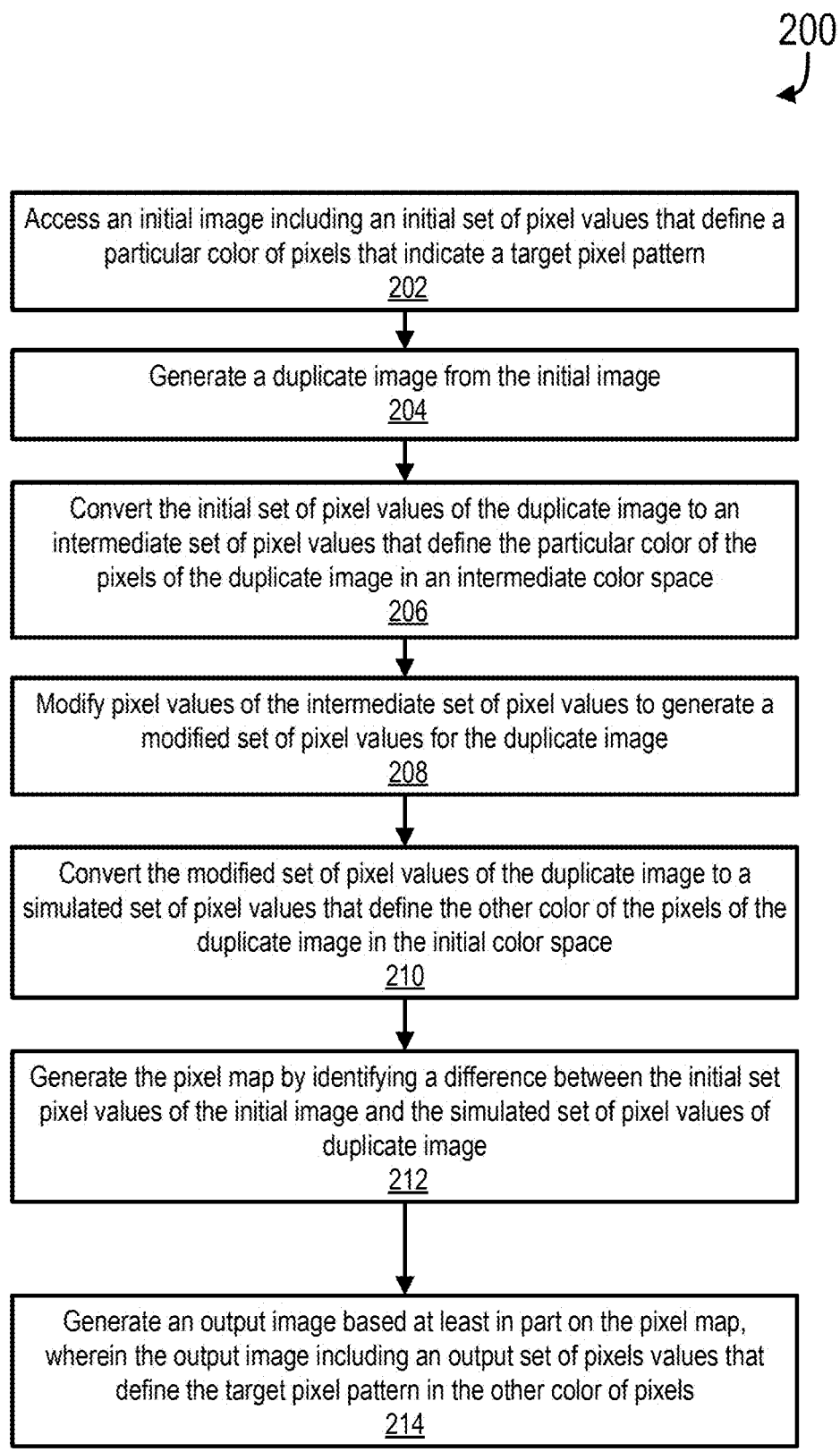
FIG. 2 illustrates a process for generating a simulated image to identify target pixel patterns in accordance with some embodiments.

FIG. 2 illustrates a process 200 for generating a simulated image to identify target pixel patterns in accordance with some embodiments. For illustrative purposes, the process 200 is described with reference to the components illustrated in FIG. 1, though other implementations are possible. For example, the program code for pixel-simulation application 115 of FIG. 1, which is stored in a non-transitory computer-readable medium, is executed by one or more processing devices to cause the server system 102 to perform one or more operations described herein.

At step 202, a pixel-simulation application accesses an initial image including an initial set of pixel values that define a particular color of pixels that indicate a target pixel pattern. In some embodiments, the target pixel pattern depicts an obscured region of the initial image which may not be visible to some users. For example, a user with protanopia is capable of identifying some content of the initial image, but may have difficulties with identifying the obscured region that includes black and dark red pixel patterns. The particular color of pixels (e.g., red, green, blue) is defined in an initial color space, in which the initial color space is a RGB color space or an HSB color space.

At step 204, the pixel-simulation application generates a duplicate image from the initial image, in which the duplicate image includes the initial set of pixel values. The duplicate image can be transformed into another image which can be used to generate a pixel map that identifies the target pixel pattern. In some embodiments, the pixel map identifies the target pixel pattern such that the obscured region becomes more visible.

At step 206, the pixel-simulation application converts the initial set of pixel values of the duplicate image to an intermediate set of pixel values that define the particular color of the pixels of the duplicate image in an intermediate color space. The intermediate color space can be the LMS color space, in which each color channel of the LMS space represents one of the three types of cones of the human eye, named for their responsivity (sensitivity) peaks at long, medium, and short wavelengths.

In some instances, the pixel-simulation application converts the initial set of pixel values of the duplicate image to the intermediate set of pixel values by applying a predetermined matrix configured to convert the initial color space (e.g., RGB) to the intermediate color space (e.g., LMS). The LMS color space can be defined based on three coordinates L, M and S, each one measuring the strength of excitation of one of the three types of cones in the retina of the human eye. In some embodiments, the spectral response curves of the three LMS color channels are substantially overlapping, such that a pixel value in the LMS color space includes at least one non-zero color-channel value. The range of perceivable colors corresponds to a volume in LMS color space which is not simply a cuboid.

The pixel-simulation application may apply a first row of values in the predetermined matrix to each pixel value of the initial set of pixel values to identify a first pixel value that defines a first color of an L channel of the LMS color space. The pixel-simulation application may then apply a second row of values in the predetermined matrix to each pixel value of the initial set of pixel values to identify a second value that defines a second color of an M channel of the LMS color space. The pixel-simulation application may apply a third row of values in the predetermined matrix to each pixel value of the initial set of pixel values to identify a third pixel value that defines a third color for an S channel of the LMS color space. Based on the calculated the first pixel value, the second pixel value, and the third pixel value, the pixel-simulation application may generate the intermediate set of pixel values, such that the intermediate set of pixel values define the particular color of pixels in the LMS color space.

At step 208, the pixel-simulation application modifies pixel values of the intermediate set of pixel values to generate a modified set of pixel values for the duplicate image. In some instances, the modified set of pixel values includes modifying a pixel value of the intermediate set of pixel values such that the modified set of pixels visually indicate another color of pixels in the intermediate color space.

The modified pixel value can include a pixel value at a color channel (e.g., L-color channel) of the intermediate color space. Different pixel colors can be simulated by modifying a pixel of a particular color channel of the intermediate color space. For example, the modified pixel value is a pixel value at a Long (L) color channel of the LMS color space, such that the modified set of pixels visually indicate the other color of pixels from a protanopia perspective. In another example, the modified pixel value is a pixel value at a Medium (M) color channel of the LMS color space, such that the modified set of pixels visually indicate the other color of pixels from a deuteranopia perspective. In yet another example, the modified pixel value is a pixel value at a Short (S) color channel of the LMS color space, such that the modified set of pixels visually indicate the other color of pixels from a tritanopia perspective.

At step 210, the pixel-simulation application converts the modified set of pixel values of the duplicate image to a simulated set of pixel values that define the other color of the pixels of the duplicate image. In some embodiments, the simulated set of pixels are defined in the initial color space (e.g., the RGB space). By reverting the modified duplicate image into the initial color space, the pixel-simulation application can calculate the pixel map by identifying the difference between the initial image and the modified duplicate image.

At step 212, the pixel-simulation application generates the pixel map by identifying a difference between the initial set pixel values of the initial image and the simulated set of pixel values of duplicate image. The pixel-simulation application can access a pixel value at a location of the initial image and subtracts it with a pixel value of the duplicate image at the same location in the duplicate image. The pixel-simulation application can store the difference between the two pixel values in a data structure, such as the pixel map.

At step 216, the pixel-simulation application generates an output image based at least in part on the pixel map, wherein the output image including an output set of pixels values that define the target pixel pattern in the other color of pixels. As a result, the pixel-simulation application may generate the output image such that it includes target pixel pattern that is identifiable by users with certain types of color blindness, including protanopia, deuteranopia, and tritanopia. In some instances, a contrast ratio between the target pixel pattern and a region in the output image is greater than a second contrast ratio between the target pixel pattern and the corresponding region in the initial image. Process 200 terminates thereafter.

Images with Target Pixel Patterns

Figure 3:
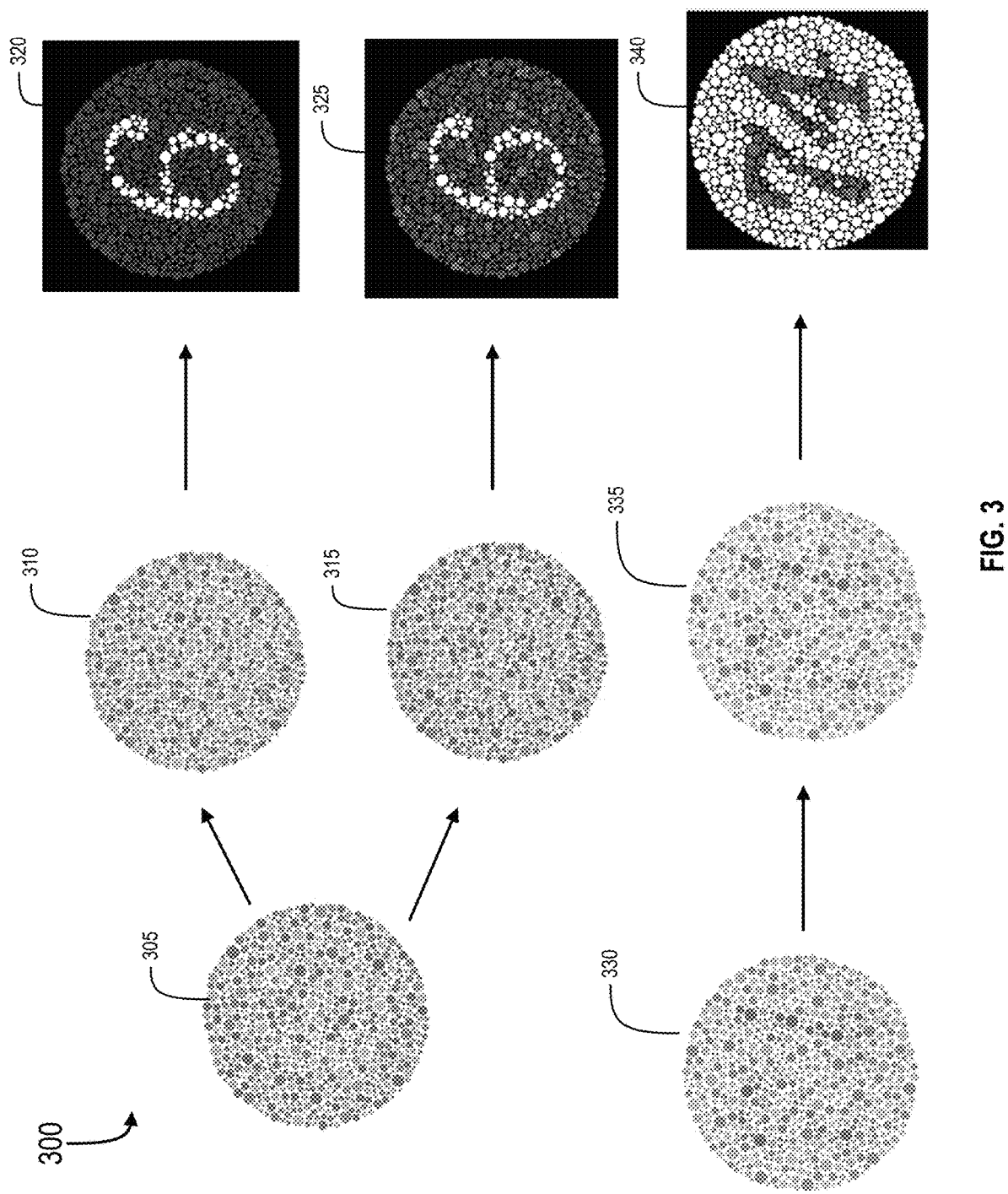
FIG. 3 illustrates a set of images with target pixel patterns in accordance with some embodiments.

FIG. 3 illustrates a set of images 300 with target pixel patterns in accordance with some embodiments. An image 305 depicts a pixel pattern with a number "6", although the pixel pattern may not be easily identifiable. Moreover, the pixel pattern of the image 305 may have lower visibility to users with a particular type of color-vision deficiency, including users associated with protanopia and deuteranopia.

In some embodiments, the pixel-simulation application accesses the image 305 and generates simulated images 310 or 315. The simulated images 310 or 315 can be generated by generating a duplicate copy of the image 305, converting the pixels of the duplicate image from an RGB color space to another color space (e.g., the LMS color space), modifying the pixels to simulate a pixel pattern that is identified to be perceived by a particular color-vision deficiency perspective, and revert the modified pixels of the duplicate image back to the RGB color space. The simulated image 310 represents the pixel pattern identifiable from a protanope perspective, in which: pure red colors are perceived to be black; purple colors cannot be distinguished from blue colors; more orange-tinted reds may appear as dim yellows; and orange-yellow-green shades appear as a similar yellow hue. The simulated image 315 represents the pixel pattern identifiable from a deuteranope perspective, which affects hue discrimination similar to the protanope but without the dimming effect.

The pixel-simulation application can generate a pixel map to generate: (i) an output image 320 from the simulated image 310; or (ii) an output image 325 from the simulated image 315. The output image 320 identifiable by the protanope may be generated by determining a difference between the image 305 and the simulated image 310. In some instances, the output image 325 identifiable by the deuteranope is generated by determining a difference between the image 305 and the simulated image 315. To determine a difference between two images, the pixel-simulation application can access pixel values of a pixel of the image 305, subtract the pixel values with those of a corresponding pixel of the simulated image 310 (for example), and store the subtracted result as pixel values of a corresponding pixel in the pixel map. The pixel-simulation application may process the pixel map to generate the output image 320 (for example), including converting the pixel map into a grayscale image. As a result, pixel pattern "6" in the output image 320 is far more visible as compared to the same pixel pattern depicted in the image 305. Similar process can be applied between the image 305 and the simulated image 315 to generate the output image 325.

Likewise, the pixel-simulation application can access an image 330, generate a simulated image 335, and generate a pixel map for the output image 340. In some embodiments, the image 330 includes another pixel pattern "74" that appears difficult for identification, and even more so for image-recognition systems or users associated with tritanopia. The simulated image 335 represents the pixel pattern "74" identifiable from a tritanerope perspective, in which pink colors appear in shades of green color and teal color appears in shades of grey color. The pixel-simulation application can access pixel values of a pixel of the image 330, subtract the pixel values with those of a corresponding pixel of the simulated image 335, and store the subtracted result as pixel values of a corresponding pixel in the pixel map. The pixel-simulation application may process the pixel map to generate the output image 340, such that the output image 340 depict the pixel pattern "74" that is readily identifiable to a tritanerope as well as image-recognition systems.

Converting Image Pixel Values to Another Color Space

Figure 4:
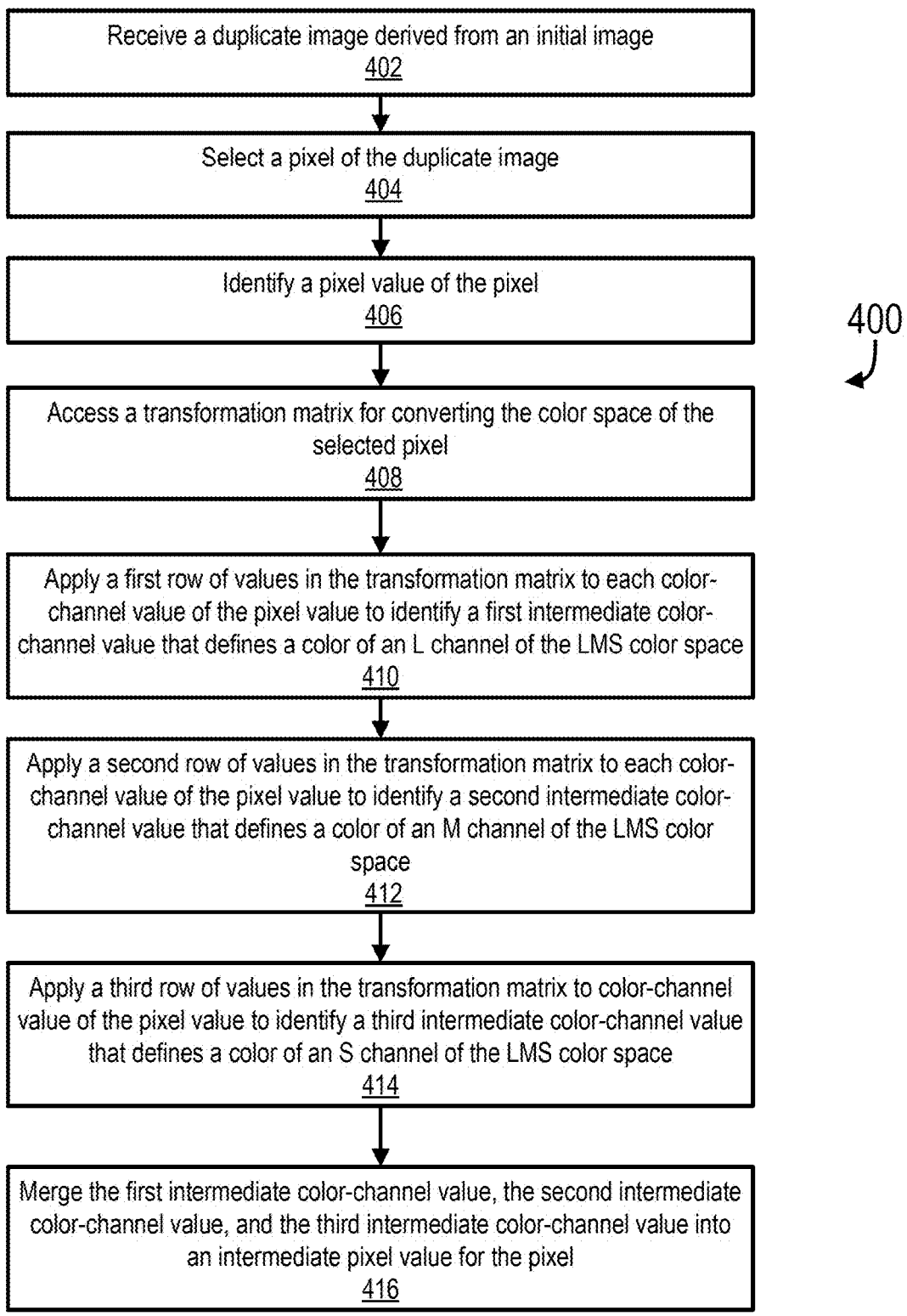
FIG. 4 illustrates a process for converting image pixel values to another color space in accordance with the embodiments.

FIG. 4 illustrates a process 400 for converting image pixel values to another color space in accordance with the embodiments. For illustrative purposes, the process 400 is described with reference to the components illustrated in FIG. 1, though other implementations are possible. For example, the program code for pixel-simulation application 115 of FIG. 1, which is stored in a non-transitory computer-readable medium, is executed by one or more processing devices to cause the server system 102 to perform one or more operations described herein.

At step 402, a pixel-simulation application receives a duplicate image derived from an initial image (e.g., the image 305 of FIG. 3). In several instances, the duplicate image includes pixel values that are identical with the initial image at an initial color space (e.g., the RGB space)

At step 404, the pixel-simulation application selects a pixel of the duplicate image. In some instances, the pixel-simulation application selects the pixel at a starting location within the duplicate image. For example, the starting location can be a two-dimensional location coordinate of (0,0) which identifies a pixel at a bottom-left part of the duplicate image. In other instances, the pixel-simulation application iterates through remaining pixels of the duplicate image to produce the intermediate set of pixel values for all pixels in the duplicate image. In such event, the pixel-simulation application increments a dimension value (e.g., x-dimension, y-dimension) of the starting location to process a pixel at another location, such as a pixel located at (1,0) location-coordinate value.

At step 406, the pixel-simulation application identifies a pixel value of the pixel. If the pixel is defined in the three-channel color space (e.g., the RGB space, the HSL space), the pixel value may include three color-channel values that ranges between 0 and 255. Each of the color-channel values corresponds to a respective color channel (e.g., an R-color channel, a G-color channel).

At step 408, the pixel-simulation application accesses a transformation matrix for converting the color space of the selected pixel. In some instances, the pixel-simulation application converts the initial set of pixel values of the duplicate image to the intermediate set of pixel values by applying a predetermined matrix configured to convert the initial color space (e.g., RGB) to the intermediate color space (e.g., LMS). In some embodiments, the predetermined matrix includes rows and columns of values, which is multiplied with another matrix that represents the pixel values of a pixel in the image. The result values may correspond to the intermediate set of values in the LSM color space. For example, the predetermined matrix includes HCBE's (Vienot's) transformation matrix algorithm:

$$\begin{pmatrix} L \\ M \\ S \end{pmatrix} = \begin{pmatrix} 17.8824 & 43.5161 & 4.11935 \\ 3.45565 & 27.1554 & 3.86714 \\ 0.0299566 & 0.18309 & 1.46709 \end{pmatrix} * \begin{pmatrix} R \\ G \\ B \end{pmatrix}$$

At step 410, the pixel-simulation application applies a first row of values in the transformation matrix to color-channel values of the pixel value to identify a first intermediate color-channel value that defines a color of an L channel of the LMS color space.

$$LMSpixel_n[0]=17.8824*RGBpixel[0]+43.5161*RGBpixel[1]+4.1194*RGBpixel[2]$$

At step 412, the pixel-simulation application applies a second row of values in the transformation matrix to color-channel values of the pixel value to identify a second intermediate color-channel value that defines a color of an M channel of the LMS color space.

$$LMSpixel_n[1]=3.4557*RGBpixel[0]+27.1554*RGBpixel[1]+3.8671*RGBpixel[2]$$

At step 414, the pixel-simulation application applies a third row of values in the transformation matrix to color-channel values of the pixel value to identify a third intermediate color-channel value that defines a color of an S channel of the LMS color space.

$$LMSpixel_n[2]=0.03*RGBpixel[0]+0.1843*RGBpixel[1]+1.4671*RGBpixel[2]$$

At step 416, the pixel-simulation application merges the first intermediate color-channel value, the second intermediate color-channel value, and the third intermediate color-channel value into an intermediate pixel value for the pixel. The pixel-simulation application then assigns the pixel to be represented by the intermediate pixel value that defines the color of the pixel in the LMS color space. The color corresponding to the intermediate pixel value can be identified based on a vector sum of the intermediate color-channel values along the spectral surface. As such, the color represented by the intermediate pixel value can be a perceivable color are inside the conical solid enclosed by the spectral surface and the plane formed by the vectors represented by the intermediate color-channel values.

$$LMSPixel_n=(x_n,y_n,z_n)$$

In some instances, the pixel-simulation application repeats the steps 404 to 416 by iterating through remaining pixels of the duplicate image. Alternatively, the pixel-simulation application repeats the steps 404 to 416 by iterating through remaining pixels of an image portion that includes the target pixel pattern. As a result, the duplicate image with an intermediate set of pixel values is thereby generated. Process 400 terminates thereafter.

Modifying Image Pixel Values to Generate a Simulated Image

Figure 5:
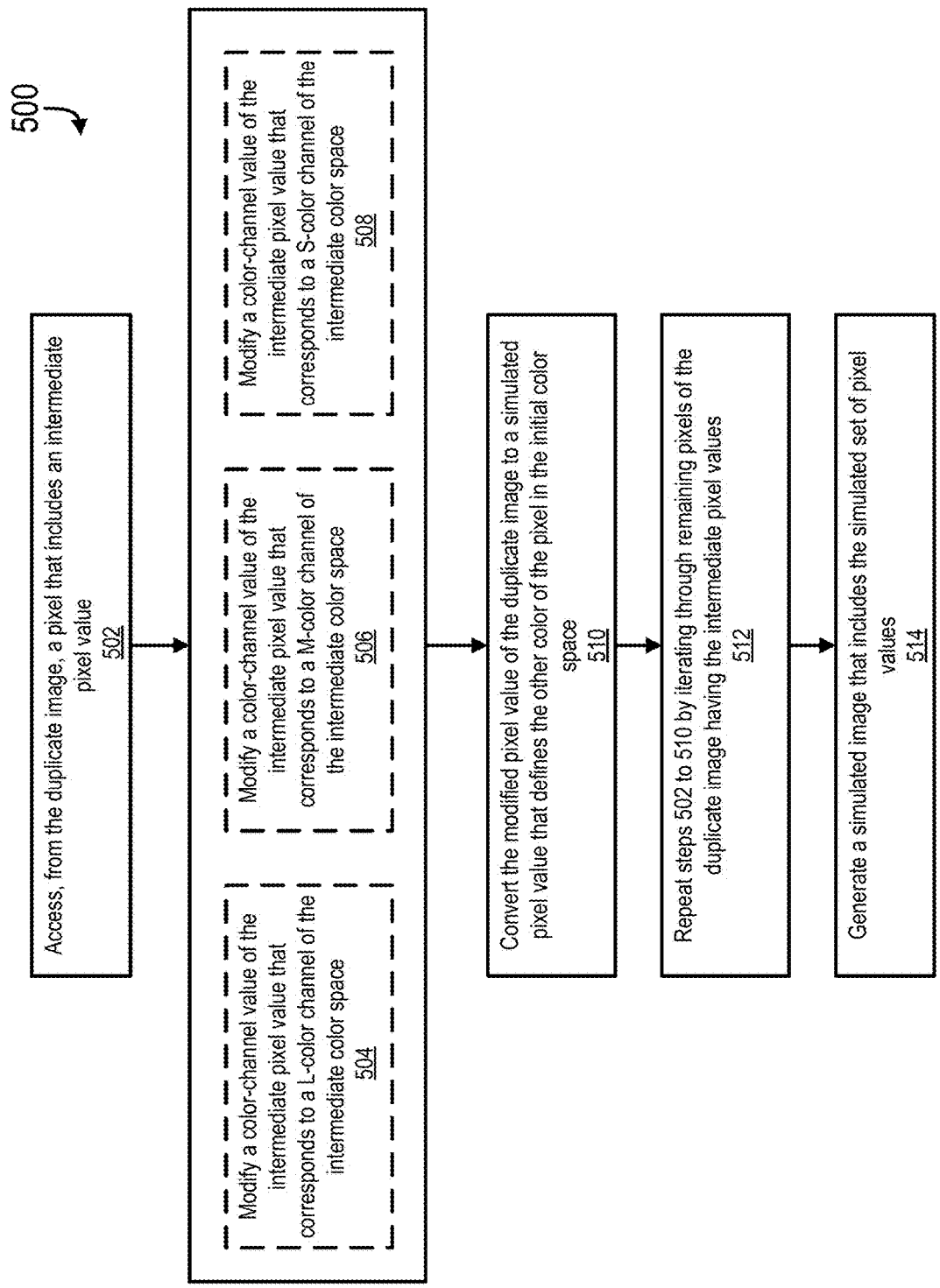
FIG. 5 illustrates a process for modifying pixel values to generate a simulated image in accordance with the embodiments.

FIG. 5 illustrates a process 500 for modifying pixel values to generate a simulated image in accordance with the embodiments. For illustrative purposes, the process 500 is described with reference to the components illustrated in FIG. 1, though other implementations are possible. For example, the program code for pixel-simulation application 115 of FIG. 1, which is stored in a non-transitory computer-readable medium, is executed by one or more processing devices to cause the server system 102 to perform one or more operations described herein.

At step 502, the pixel-simulation application accesses, from the duplicate image, a pixel that includes an intermediate pixel value. In some embodiments, the intermediate set of pixel values are defined in an intermediate color space, such as the LMS color space. The intermediate pixel value can include a merged set of a first intermediate color-channel value, a second intermediate color-channel value, and a third intermediate color-channel value, each of which generated based on converting the RGB color-channel values associated with the pixel.

The pixel-simulation application modifies the intermediate pixel value to generate a modified pixel value for the pixel. In some instances, the pixel-simulation application modifies at least one color-channel value of the intermediate pixel value. The pixel-simulation application selects at least one color-channel value for modification, based on a type of color-vision deficiency to be simulated. As such, the pixel-simulation application may perform one or more of steps 504, 506, or 508, to generate the modified pixel value for the pixel.

At step 504, the pixel-simulation application modifies a color-channel value of the intermediate pixel value that corresponds to a L-color channel of the intermediate color space. Modifying a color-channel value at the L-color channel results in the modified pixel value visually indicating the a color for the pixel be perceived by a protanope. The modified color-channel value can be generated based on applying a set of parameters to color-channel values of other color channels (e.g., M-color channel, S-color channel) of the intermediate color space.

$$LMSpixel[0]_{protanopia} = 2.02344 * LMSpixel[1] - 2.52581 * LMSpixel[2]$$

At step 506, the pixel-simulation application modifies a color-channel value of the intermediate pixel value that corresponds to a M-color channel of the intermediate color space. Modifying a color-channel value at the M-color channel results in the modified pixel value visually indicating the a color for the pixel be perceived by a deuteranope. The modified color-channel value can be generated based on applying a set of parameters to color-channel values of other color channels (e.g., L-color channel, S-color channel) of the intermediate color space.

$$LMSpixel[1]_{deuteranopia} = 0.49421 * LMSpixel[0] + 1.24827 * LMSpixel[2]$$

At step 508, the pixel-simulation application modifies a color-channel value of the intermediate pixel value that corresponds to a S-color channel of the intermediate color space. Modifying a color-channel value at the S-color channel results in the modified pixel value visually indicating the a color for the pixel be perceived by a tritanope. The modified color-channel value can be generated based on applying a set of parameters to color-channel values of other color channels (e.g., L-color channel, M-color channel) of the intermediate color space.

$$LMSpixel[2]_{tritanopia} = -0.395913 * LMSpixel[0] + 0.801109 * LMSpixel[1]$$

At step 510, the pixel-simulation application converts the modified pixel value of the duplicate image to a simulated pixel value that defines the other color of the pixel in the initial color space (e.g., the RGB color space). In some embodiments, the pixel-simulation application converts the modified pixel value to the simulated pixel value by applying another transformation matrix configured to revert the intermediate color space (e.g., LMS) to the initial color space (e.g., RGB). For example, the simulated pixel value that define the pixel color perceived by the protanope perspective is generated by calculating each color-channel value of the simulated pixel value based on color-channel values of the modified pixel value:

$$RGBpixel[0]_{protanopia} = 0.0809 * LMSpixel[0]_{protanopia} - 0.1305 * LMSpixel[1] + 0.1167 * LMSpixel[2]$$

$$RGBpixel[1]_{protanopia} = -0.0102 * LMSpixel[0]_{protanopia} + 0.0540 * LMSpixel[1] + 0.1136 * LMSpixel[2]$$

$$RGBpixel[2]_{protanopia} = -0.0004 * LMSpixel[0]_{protanopia} - 0.0041 * LMSpixel[1] + 0.6935 * LMSpixel[2]$$

By reverting the modified duplicate image into the initial color space, the pixel-simulation application can calculate the pixel map by identifying the difference between the initial image and the modified duplicate image.

At step 512, the pixel-simulation application repeats the steps 502 to 510 by iterating through remaining pixels of the duplicate image having the intermediate pixel values. Alternatively, the pixel-simulation application repeats the steps 502 to 510 by iterating through remaining pixels of an image portion that includes the target pixel pattern. As a result, the intermediate set of pixel values of the duplicate image are converted into the simulated set of pixel values. At step 514, the pixel-simulation application generates a simulated image that includes the simulated set of pixel values. Process 500 terminates thereafter.

Generating Pixel Map to Identify Target Pixel Patterns

Figure 6:
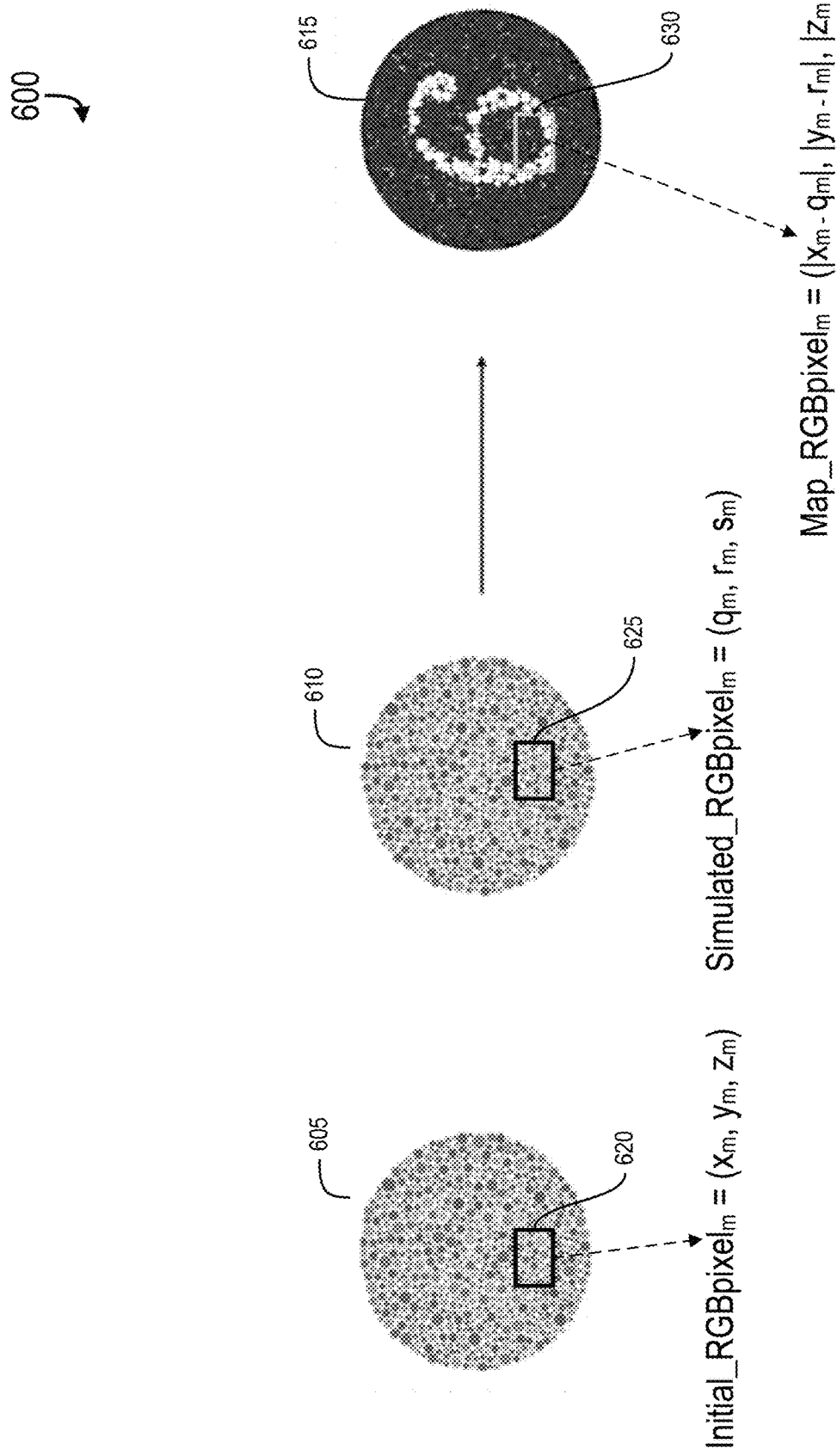
FIG. 6 illustrates a diagram that illustrates an example of generating a pixel map to identify target pixel patterns in accordance with some embodiments.

FIG. 6 illustrates a diagram 600 that illustrates an example of generating a pixel map to identify target pixel patterns in accordance with some embodiments. The diagram 600 includes an initial image 605, a simulated image 610, and a pixel map 615. In some instances, pixel values of the initial image 605 and the simulated image 610 are defined in the same color space (e.g., the RGB color space).

The pixel-simulation application generates the pixel map 615 by identifying a difference between the initial set pixel values of the initial image 605 and the simulated set of pixel values of the simulated image 610. In particular, the pixel-simulation application can access a pixel 620 of the initial image. The pixel-simulation application subtracts a pixel value of the pixel 620 with a pixel value of the pixel 625 of the simulated image 625. As a result, the pixel-simulation application can assign the difference of pixel values as a new pixel value of a pixel 630 of the pixel map 615. As shown in the pixel map 615, the pixel 630 includes the new pixel value that is contrasted with a remaining portion of the pixel map 615. The high contrast ratio between the pixel 630 and the remaining image portion increases the visibility of the target pixel pattern of the image 615.

In some instances, the pixel-simulation application generates an output image based at least in part on the pixel map 615, in which the output image includes a set of pixels values that are configured to increase visibility of the target pixel pattern for users with certain color-vision deficiencies. As a result, the output image includes target pixel pattern that is easily identifiable by users and may be customized based on a type of color-vision deficiency, including protanopia, deuteranopia, and tritanopia. In some instances, a contrast ratio between the target pixel pattern and a region in the output image is greater than a contrast ratio between the target pixel pattern (e.g., pattern that includes the pixel 620) and the corresponding region in the initial image 605. Additionally or alternatively, the output image is further converted into a grayscale image.

Enhancing Visibility of the Target Pixel Pattern

Figure 7:
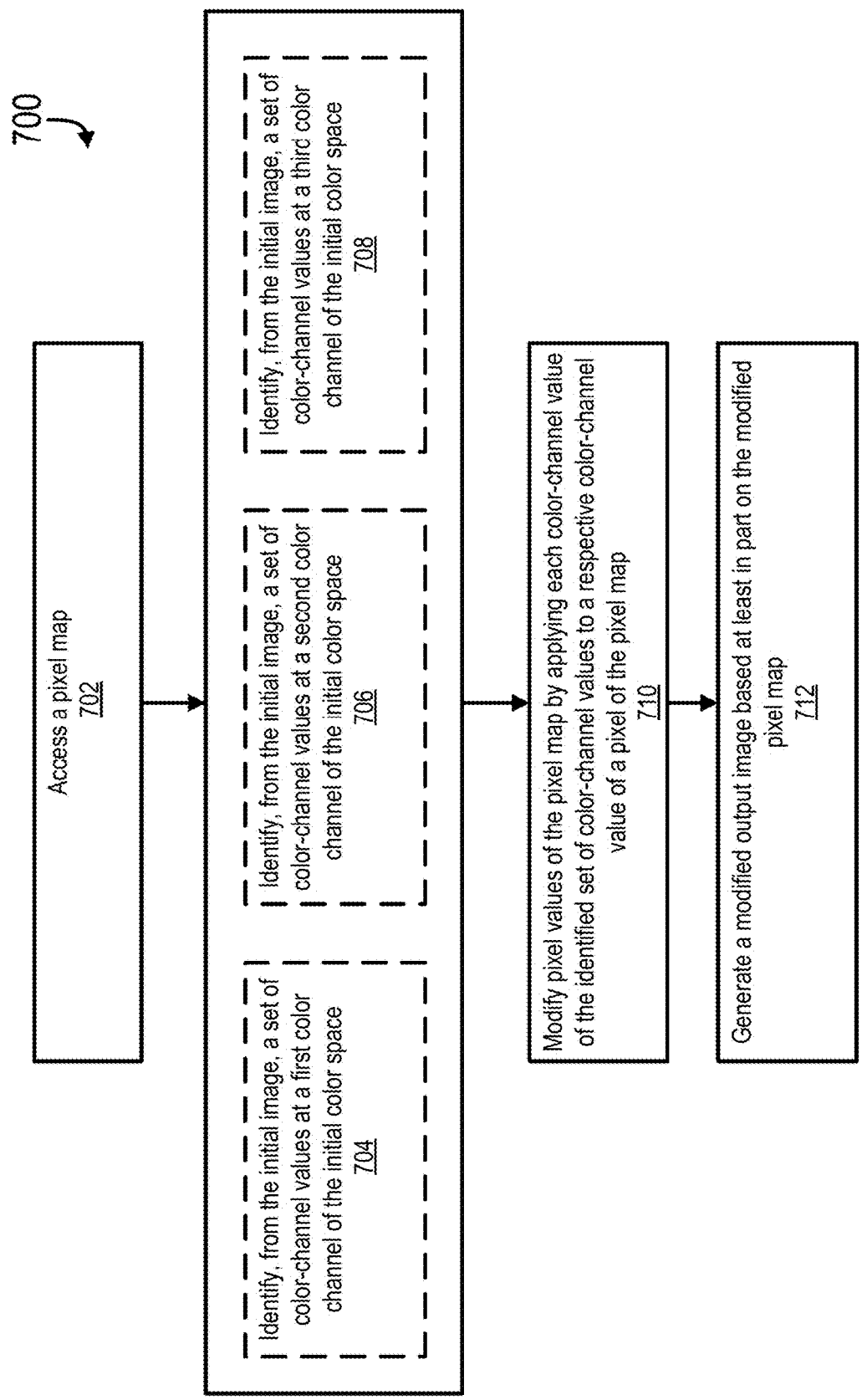
FIG. 7 illustrates a process for enhancing visibility of a target pixel pattern in accordance with the embodiments.

FIG. 7 illustrates a process 700 for enhancing visibility of a target pixel pattern in accordance with the embodiments. For illustrative purposes, the process 700 is described with reference to the components illustrated in FIG. 1, though other implementations are possible. For example, the program code for pixel-simulation application 115 of FIG. 1, which is stored in a non-transitory computer-readable medium, is executed by one or more processing devices to cause the server system 102 to perform one or more operations described herein.

At step 702, the pixel-simulation application accesses a pixel map (e.g., the pixel map 615 of FIG. 6). In some instances, the pixel map identifies the target pixel pattern such that the obscured region becomes more visible. As described herein, the pixel-simulation application generates the pixel map by identifying a difference between an initial set of pixel values of the initial image and the simulated set of pixel values of duplicate image.

The pixel-simulation application identifies a set of color-channel values from pixels of the initial image. In several embodiments, a color-channel value of a pixel identifies a value corresponding to a particular color channel of the initial image. For example, the pixel-simulation application identifies, for each pixel of the initial image, a color-channel value corresponding to a green-color channel. To identify the set of color-channel values, the pixel-simulation application initially selects a color channel. The color channel can be selected depending on a type of color-vision deficiency for which the output image is generated. As such, the pixel-simulation application may perform one or more of steps 704, 706, or 708, depending on the selected color channel.

At step 704, the pixel-simulation application identifies, from the initial image, a set of color-channel values atss a first color channel of the initial color space. The first color channel can be a red-color channel of the RGB color space. For example, the pixel-simulation application identifies, for a given pixel, a first index value 77 of a three-dimensional array (194, 137, 243) that represents the pixel value at the RGB color space. The pixel-simulation application sets the first index value 77 as a color-channel value that represents the pixel. The pixel-simulation application iterates through other pixels of the initial image to identify a set of color-channel values corresponding to the red-color channel.

At step 706, the pixel-simulation application identifies, from the initial image, a set of color-channel values at a second color channel of the initial color space. The second color channel can be a green-color channel of the RGB color space. Referring to the above example, the pixel-simulation application identifies, for the given pixel, a second index value 137 of the three-dimensional array (194, 137, 243) that represents the pixel value at the RGB color space. The pixel-simulation application sets the second index value 137 as a color-channel value that represents the pixel. The pixel-simulation application iterates through other pixels of the initial image to identify a set of color-channel values corresponding to the green channel. In some instances, the pixel-simulation application identifies the set of color-channel values from the green-color channel to generate an output image that enhances visibility for users with green-red deficiency (e.g., deuteranopia).

At step 708, the pixel-simulation application identifies, from the initial image, a set of color-channel values at a third color channel of the initial color space. The third color channel can be a blue-color channel of the RGB color space. Referring to the above example, the pixel-simulation application identifies, for the given pixel, a third index value 243 of the three-dimensional array (194, 137, 243) that represents the pixel value at the RGB color space. The pixel-simulation application sets the third index value 243 as a color-channel value that represents the pixel. The pixel-simulation application iterates through other pixels of the initial image to generate a set of color-channel values corresponding to the blue-color channel. In some instances, the pixel-simulation application identifies the set of color-channel values from the blue-color channel to identify an output image that enhances visibility for users with blue-yellow deficiency (e.g., tritanopia).

At step 710, the pixel-simulation application modifies pixel values of the pixel map by applying each color-channel value of the identified set of color-channel values to a respective color-channel value of a pixel of the pixel map. For example, the pixel-simulation application identifies that the set of color-channel values is associated with a green-color channel. In response, the pixel-simulation application applies the color-channel value to a second index value 42 of a three-dimensional array (89, 42, 197) that represents the pixel value of a pixel of the pixel map. In some embodiments, the pixel-simulation application iterates through other pixels of the pixel map to modify the pixel values of the pixel map.

At step 712, the pixel-simulation application generates a modified output image based at least in part on the modified pixel map. The modified output image (e.g., a modified grayscale image) depicts the target pixel pattern such that visibility is further enhanced for users with a particular color-vision deficiency (e.g., protanopia, deuteranopia, tritanopia). For example, the modified output image is generated from applying the set of color-channel values from the blue-color channel to further enhance visibility for users with blue-yellow color deficiency (e.g., tritanopia). In another example, the modified output image is generated from applying the set of color-channel values from the green-color channel to further enhance visibility for users with red-green color deficiency (e.g., deuteranopia). By adding additional color-channel information into the output image, the visibility of the target pixel pattern can be substantially enhanced for users with a certain color-vision deficiency. Process 700 terminates thereafter.

Screenshot Examples

Figure 8:
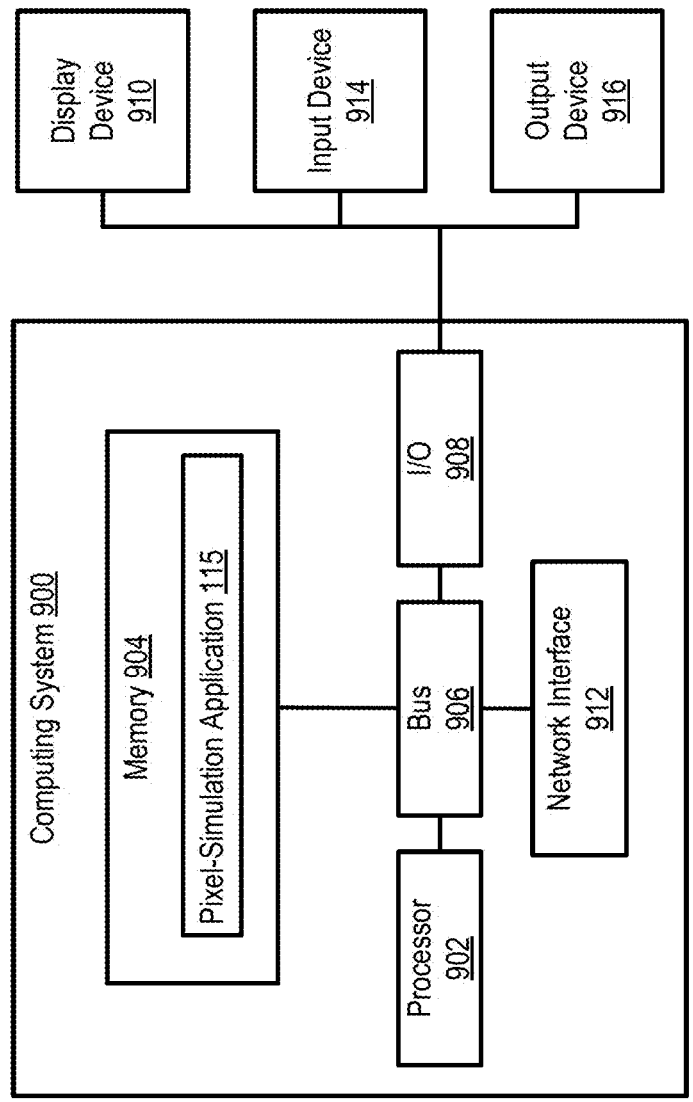
FIG. 8A-C depict screenshots that show examples of a user interface that identifies target pixel patterns in accordance with some embodiments.
Figure 8A:
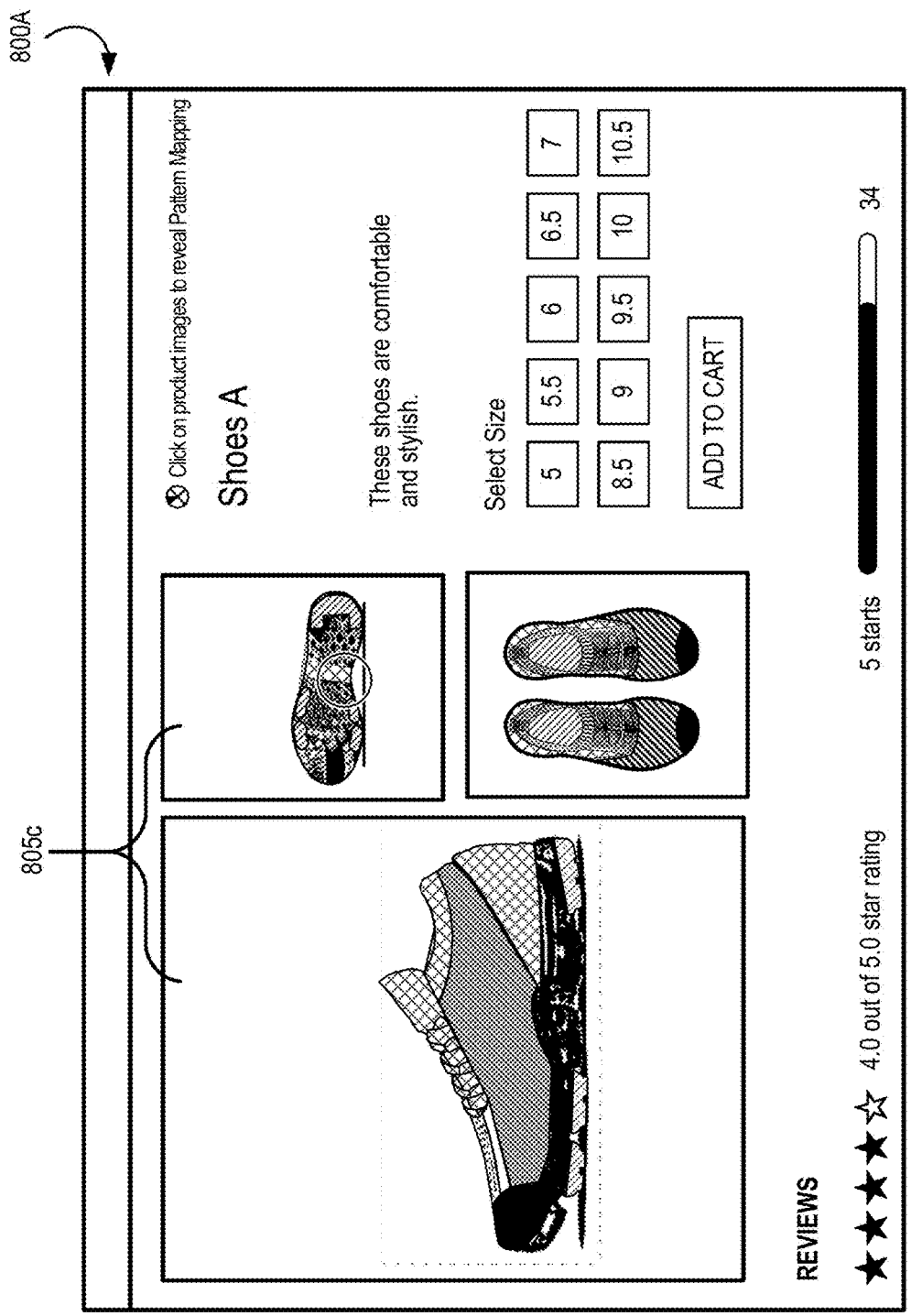
Figure 8B:
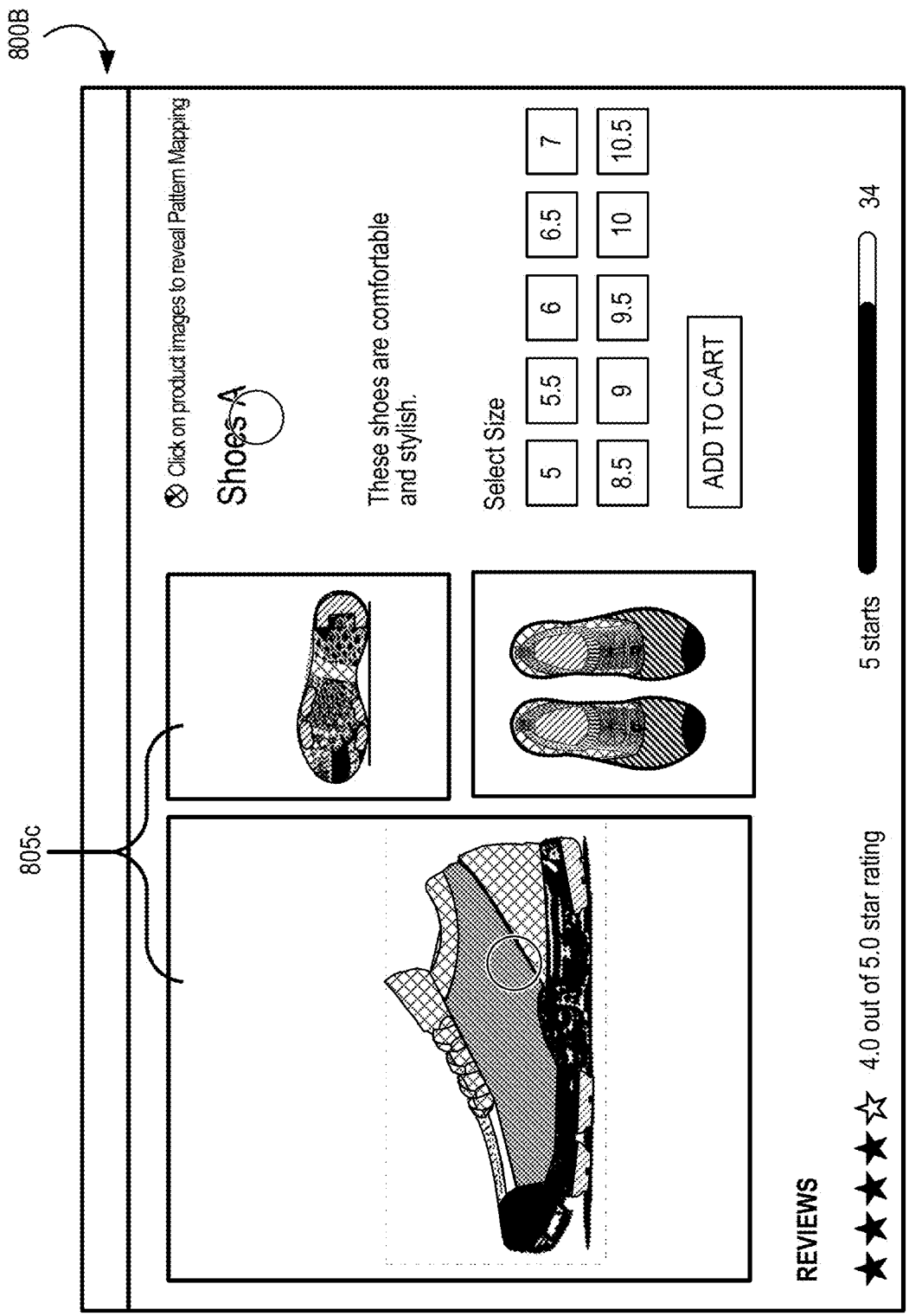
Figure 8C:
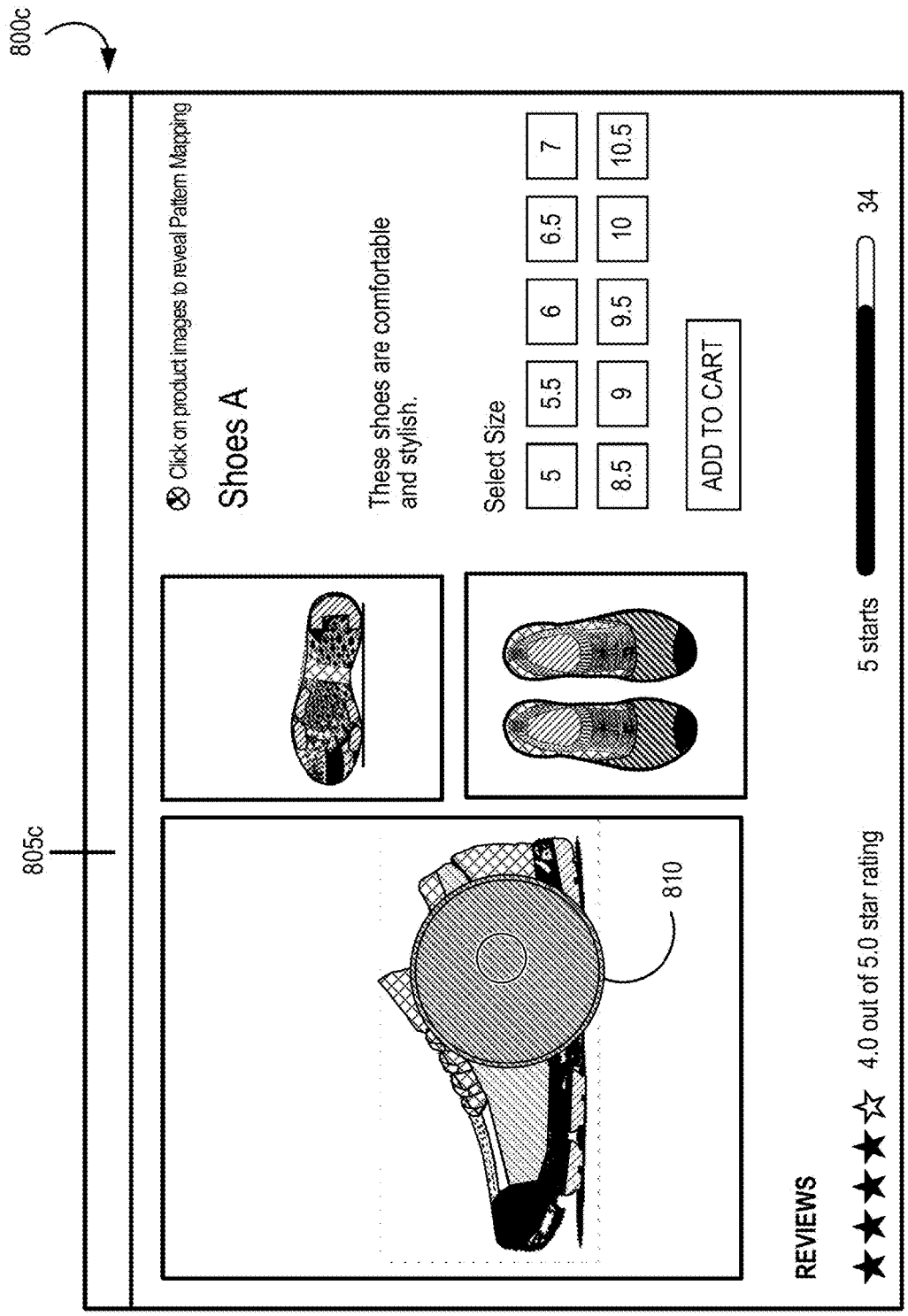

FIG. 8A-C depict screenshots 800A-C that show examples of a user interface that identifies target pixel patterns in accordance with some embodiments. Referring to FIG. 8A, a user interface of a client device (e.g., the client system 103a of FIG. 1) displays a screenshot 800A. The screenshot 800A includes three initial images, each of which displaying shoes from different angles. The shoes depicted in the initial images include orange and gray colors in swirled patterns. The swirled patterns with orange and gray colors can be identified by many users, though the pattern visibility may decrease for users with protanopia, tritanopia, or deuteranopia.

Referring to FIG. 8B, the user interface displays a screenshot 800B. The screenshot 800B includes three simulated images, each of which displaying shoes from different angles. The shoes depicted in the simulated images include light green and gray colors in swirled patterns. As described herein, the simulated images can be generated by modifying pixel values of the image pixels defined in the LMS color space, then converting the modified pixel values back into the RGB color space. The swirled patterns with light green and gray colors simulate colors of the shoes that would be perceived by the users with protanopia.

Referring to FIG. 8C, the user interface displays a screenshot 800C. The screenshot 800C includes three simulated images, each of which displaying shoes from different angles. The shoes depicted in the simulated images includes light green and gray colors in swirled patterns. The swirled patterns with light green and gray colors simulate colors of the shoes that would be perceived by the users with protanopia. In addition to displaying the simulated images, the user interface also provides an output image 810, which can identify pixel patterns on at least portion of the simulated images 805C. As shown in FIG. 8C, the output image 810 substantially increase the visibility of identified pixel patterns to the users with protanopia. In some instances, the pixel-simulation application generates additional sets of simulated images for the user interface. Each set of the additional sets of simulated images depict the identified pixel patterns (e.g., swirled pattern) in different color combinations. Thus, the additional sets of simulated images can substantial increase the visibility of identified pixel patterns to the users with a respective type of color-vision deficiency (e.g., deuteranopia, tritanopia).

Example of a Computing Environment

Any suitable computing system or group of computing systems can be used for performing the operations described herein. For example, FIG. 9 depicts a computing system 900 that can implement any of the computing systems or environments discussed above. In some embodiments, the computing system 900 includes a processing device 902 that executes the pixel-simulation application 115, a memory that stores various data computed or used by the pixel-simulation application 115, an input device 914 (e.g., a mouse, a stylus, a touchpad, a touchscreen, etc.), and an output device 916 that presents output to a user (e.g., a display device that displays graphical content generated by the pixel-simulation application 115). For illustrative purposes, FIG. 9 depicts a single computing system on which the pixel-simulation application 115 is executed, and the input device 914 and output device 916 are present. But these applications, datasets, and devices can be stored or included across different computing systems having devices similar to the devices depicted in FIG. 9.

The example of FIG. 9 includes a processing device 902 communicatively coupled to one or more memory devices 904. The processing device 902 executes computer-executable program code stored in a memory device 904, accesses information stored in the memory device 904, or both. Examples of the processing device 902 include a microprocessor, an application-specific integrated circuit ("ASIC"), a field-programmable gate array ("FPGA"), or any other suitable processing device. The processing device 902 can include any number of processing devices, including a single processing device.

The memory device 904 includes any suitable non-transitory, computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 900 may also include a number of external or internal devices, such as a display device 910, or other input or output devices. For example, the computing system 900 is shown with one or more input/output ("I/O") interfaces 908. An I/O interface 908 can receive input from input devices or provide output to output devices. One or more buses 906 are also included in the computing system 900. Each bus 906 communicatively couples one or more components of the computing system 900 to each other or to an external component.

The computing system 900 executes program code that configures the processing device 902 to perform one or more of the operations described herein. The program code includes, for example, code implementing the pixel-simulation application 115 or other suitable applications that perform one or more operations described herein. The program code may be resident in the memory device 904 or any suitable computer-readable medium and may be executed by the processing device 902 or any other suitable processor. In some embodiments, all modules in the pixel-simulation application 115 are stored in the memory device 904, as depicted in FIG. 9. In additional or alternative embodiments, one or more of these modules from the pixel-simulation application 115 are stored in different memory devices of different computing systems.

In some embodiments, the computing system 900 also includes a network interface device 912. The network interface device 912 includes any device or group of devices suitable for establishing a wired or wireless data connection to one or more data networks. Non-limiting examples of the network interface device 912 include an Ethernet network adapter, a modem, and/or the like. The computing system 900 is able to communicate with one or more other computing devices (e.g., a computing device that receives inputs for pixel-simulation application 115 or displays outputs of the pixel-simulation application 115) via a data network using the network interface device 912.

An input device 914 can include any device or group of devices suitable for receiving visual, auditory, or other suitable input that controls or affects the operations of the processing device 902. Non-limiting examples of the input device 914 include a touchscreen, stylus, a mouse, a keyboard, a microphone, a separate mobile computing device, etc. An output device 916 can include any device or group of devices suitable for providing visual, auditory, or other suitable sensory output. Non-limiting examples of the output device 916 include a touchscreen, a monitor, a separate mobile computing device, etc.

Although FIG. 9 depicts the input device 914 and the output device 916 as being local to the computing device that executes the pixel-simulation application 115, other implementations are possible. For instance, in some embodiments, one or more of the input device 914 and the output device 916 include a remote client-computing device that communicates with the computing system 900 via the network interface device 912 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A computer-implemented method for improving visibility of target pixel patterns in an image, the method comprising:
accessing an initial image comprising an initial set of pixel values that define, in an initial color space, a particular color of pixels that indicate a target pixel pattern;
generating a duplicate image from the initial image, wherein the duplicate image includes the initial set of pixel values;
converting the initial set of pixel values of the duplicate image to an intermediate set of pixel values that define the particular color of the pixels of the duplicate image in an intermediate color space;
modifying pixel values of the intermediate set of pixel values to generate a modified set of pixel values for the duplicate image, wherein the modified set of pixel values is generated by modifying a pixel value of the intermediate set of pixel values such that the modified set of pixel values visually indicate another color of pixels in the intermediate color space, wherein the other color of the pixels is different from the particular color of the pixels;
converting the modified set of pixel values of the duplicate image to a simulated set of pixel values that define, in the initial color space, the other color of the pixels of the duplicate image;
generating a pixel map by identifying a difference between the initial set of pixel values of the initial image and the simulated set of pixel values of duplicate image;
generating, for display, an output image based at least in part on the pixel map, wherein the output image comprising an output set of pixels values that define the target pixel pattern in the other color; and
outputting the output image.

2. The computer-implemented method of claim 1, wherein:
the initial color space is a Red, Green, Blue (RGB) color space or a Hue, Saturation, Brightness (HSB) color space; and
the intermediate color space is a Long, Medium, Short (LMS) color space.

3. The computer-implemented method of claim 2, wherein a modified pixel value of the modified set of pixel values is a pixel value associated with a Long (L) color channel of the LMS color space, such that the modified set of pixel values represent a color of pixels identifiable by a user having protanopia.

4. The computer-implemented method of claim 2, wherein a modified pixel value of the modified set of pixel values is a pixel value associated with a Medium (M) color channel of the LMS color space, such that the modified set of pixel values represent a color of pixels identifiable by a user having deuteranopia.

5. The computer-implemented method of claim 2, wherein a modified pixel value of the modified set of pixel values is a pixel value associated with a Short (S) color channel of the LMS color space such that the modified set of pixel values represent a color of pixels identifiable by a user having tritanopia.

6. The computer-implemented method of claim 1, wherein a first contrast ratio between the target pixel pattern and a region in the output image is greater than a second contrast ratio between the target pixel pattern and the region in the initial image.

7. The computer-implemented method of claim 1, further comprising:
identifying, from the initial set of pixel values, a first value at a color channel of a pixel of the initial image;
applying the identified first value to a second value at the same color channel of a respective pixel of the pixel map, thereby generating a modified pixel value for the respective pixel;
generating, for display, a modified output image that includes at least the respective pixel represented by the modified pixel value; and
outputting the modified output image.

8. A system for improving visibility of target pixel patterns in an image, the system comprising:
one or more processors; and
a memory having stored thereon instructions that, upon execution by the one or more processors, cause the one or more processors to:
access an initial image comprising an initial set of pixel values that define, in an initial color space, a particular color of pixels that indicate a target pixel pattern;
generate a duplicate image from the initial image, wherein the duplicate image includes the initial set of pixel values;
convert the initial set of pixel values of the duplicate image to an intermediate set of pixel values that define the particular color of the pixels of the duplicate image in an intermediate color space;
modify pixel values of the intermediate set of pixel values to generate a modified set of pixel values for the duplicate image, wherein the modified set of pixel values is generated by modifying a pixel value of the intermediate set of pixel values such that the modified set of pixel values visually indicate another color of pixels in the intermediate color space, wherein the other color of the pixels is different from the particular color of the pixels;

convert the modified set of pixel values of the duplicate image to a simulated set of pixel values that define, in the initial color space, the other color of the pixels of the duplicate image;

generate a pixel map by identifying a difference between the initial set of pixel values of the initial image and the simulated set of pixel values of duplicate image;

generate, for display, an output image based at least in part on the pixel map, wherein the output image comprising an output set of pixels values that define the target pixel pattern in the other color; and output the output image.

9. The system of claim 8, wherein:

the initial color space is a Red, Green, Blue (RGB) color space or a Hue, Saturation, B rightness (HSB) color space; and the intermediate color space is a Long, Medium, Short (LMS) color space.

10. The system of claim 9, wherein a modified pixel value of the modified set of pixel values is a pixel value associated with a Long (L) color channel of the LMS color space, such that the modified set of pixel values represent a color of pixels identifiable by a user having protanopia.

11. The system of claim 9, wherein a modified pixel value of the modified set of pixel values is a pixel value associated with a Medium (M) color channel of the LMS color space, such that the modified set of pixel values represent a color of pixels identifiable by a user having deuteranopia.

12. The system of claim 9, wherein a modified pixel value of the modified set of pixel values is a pixel value associated with a Short (S) color channel of the LMS color space, such that the modified set of pixel values represent a color of pixels identifiable by a user having tritanopia.

13. The system of claim 8, wherein a first contrast ratio between the target pixel pattern and a region in the output image is greater than a second contrast ratio between the target pixel pattern and the region in the initial image.

14. The system of claim 9, wherein the instructions further cause the one or more processors to:

identify, from the initial set of pixel values, a first value at a color channel of a pixel of the initial image;

apply the identified first value to a second value at the same color channel of a respective pixel of the pixel map, thereby generating a modified pixel value for the respective pixel;

generate, for display, a modified output image that includes at least the respective pixel represented by the modified pixel value; and output the modified output image.

15. A computer program product for improving visibility of target pixel patterns in an image, the computer program product tangibly embodied in a non-transitory machine-readable storage medium, the non-transitory machine-readable storage medium including instructions configured to cause one or more data processors to perform actions including:

accessing an initial image comprising an initial set of pixel values that define, in an initial color space, a particular color of pixels that indicate a target pixel pattern;

generating a duplicate image from the initial image, wherein the duplicate image includes the initial set of pixel values;

converting the initial set of pixel values of the duplicate image to an intermediate set of pixel values that define the particular color of the pixels of the duplicate image in an intermediate color space;

modifying pixel values of the intermediate set of pixel values to generate a modified set of pixel values for the duplicate image, wherein the modified set of pixel values is generated by modifying a pixel value of the intermediate set of pixel values such that the modified set of pixel values visually indicate another color of pixels in the intermediate color space, wherein the other color of the pixels is different from the particular color of the pixels;

converting the modified set of pixel values of the duplicate image to a simulated set of pixel values that define, in the initial color space, the other color of the pixels of the duplicate image;

generating a pixel map by identifying a difference between the initial set pixel of values of the initial image and the simulated set of pixel values of duplicate image;

generating, for display, an output image based at least in part on the pixel map, wherein the output image comprising an output set of pixels values that define the target pixel pattern in the other color; and outputting the output image.

16. The computer program product of claim 15, wherein:

the initial color space is a Red, Green, Blue (RGB) color space or a Hue, Saturation, B rightness (HSB) color space; and the intermediate color space is a Long, Medium, Short (LMS) color space.

17. The computer program product of claim 16, wherein a modified pixel value of the modified set of pixel values is a pixel value associated with a Long (L) color channel of the LMS color space, such that the modified set of pixel values represent a color of pixels identifiable by a user having protanopia.

18. The computer program product of claim 16, wherein a modified pixel value of the modified set of pixel values is a pixel value associated with a Medium (M) color channel of the LMS color space, such that the modified set of pixel values represent a color of pixels identifiable by a user having deuteranopia.

19. The computer program product of claim 16, wherein a modified pixel value of the modified set of pixel values is a pixel value associated with a Short (S) color channel of the LMS color space such that the modified set of pixel values represent a color of pixels identifiable by a user having tritanopia.

20. The computer program product of claim 16, wherein instructions further cause the one or more data processors to perform actions including:

identifying, from the initial set of pixel values, a first value at a color channel of a pixel of the initial image;

applying the identified first value to a second value at the same color channel of a respective pixel of the pixel map, thereby generating a modified pixel value for the respective pixel;

generating, for display, a modified output image that includes at least the respective pixel represented by the modified pixel value; and outputting the modified output image.

* * * * *